Figure 3:
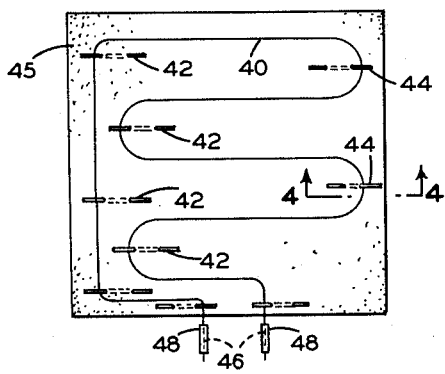

July 14, 1964   R. R. BATCHER   3,141,090
PORTABLE HEATING TRAYS
Filed Oct. 24, 1961   2 Sheets-Sheet 1
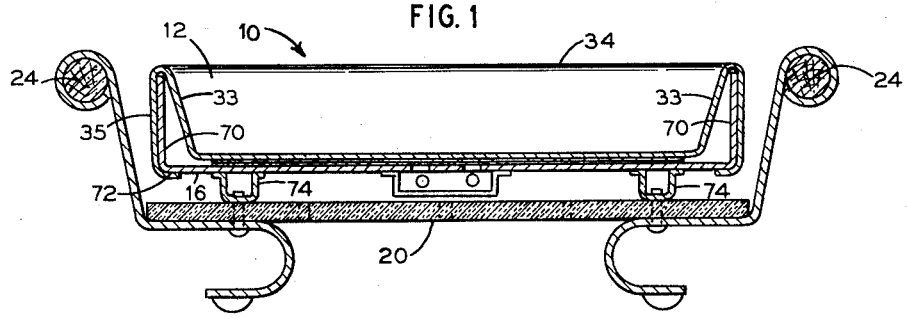
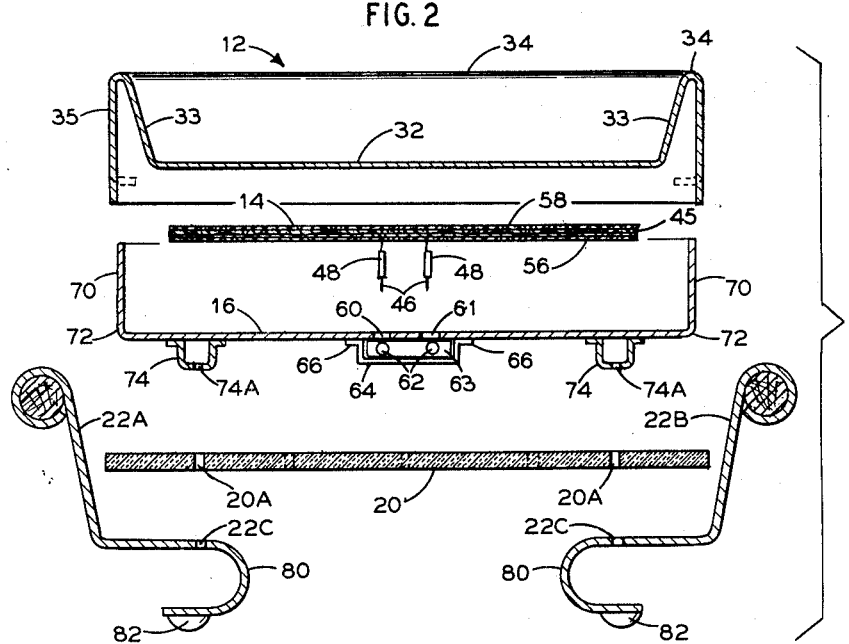
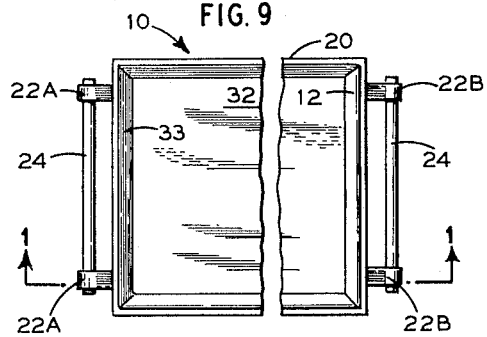
INVENTOR.
Ralph R. Batcher
BY
*J.W. Foster*
ATTORNEY United States Patent Office 3,141,090
Patented July 14, 1964

3,141,090
PORTABLE HEATING TRAYS
Ralph R. Batcher, Douglaston, N.Y., assignor to Irwin F. Mills Associates, New York, N.Y.
Filed Oct. 24, 1961, Ser. No. 147,249
2 Claims. (Cl. 219—438)

This invention relates to a portable heating tray, or hot server, for keeping foods hot, when removed from a cooking stove, and while they are being served.

One object of this invention is to provide such a tray that is simple in construction and economical to manufacture.

Another object of the invention is to provide such a tray having a heating element to keep a top surface heated, with a suitable insulation barrier disposed between the heating element and a table surface, or the like, on which the tray may be placed during use.

Another object of the invention is to provide such a tray in which the top surface of the tray, which serves as the heated surface of the tray, is provided with a raised rim or border to prevent any food receptacles from accidentally slipping off the tray while the tray is being carried.

Another object of the invention is to provide a portable heating tray in which the heated portion of the tray is formed as a shell receptacle, which is combined with a heat baffle disposed under the heated portion, to protect a surface on which the heated tray is disposed.

Another object of the invention is to provide a portable heating tray in which a heating plate with a flat top surface consists of a metal member having a flat bottom surface and an electrical heating element secured to said bottom surface.

The tray made in accordance with this invention, consists, essentially, of two main members. The first member is the main or heated part of the tray and the second member serves as an auxiliary supporting and insulating member for the tray.

The main heated member has a top element that is formed as a shallow dish-shaped shell having a flat bottom and a raised rim, around the border surrounding the flat bottom, to prevent accidental spilling or slipping of food containers being carried on the tray. A heating element is secured to the under side of the flat bottom of the shell and serves to keep the exposed upper surface of that flat bottom heated to the desired temperature. The heating element is secured and held in place against the bottom of the shallow shell, by an apron extending downwardly from the rim of the shell and folded inwardly over the outer edge of a generally flat metal supporting plate for the heating element.

The main heated member with the heating element and the supporting plate thus constitute, in effect, a sandwich with the heating element encased between the top plate and the supporting member.

The metal supporting plate for the heating element serves also as a support for a small receptacle or box for a terminal plug for electrical connection to an external circuit. That supporting plate also carries tabs pressed out, or brackets attached for supporting a heat shield or baffle underneath the heated shell. The heat shield and baffle is also provided with feet at its corners and serves as the support for the upper shell to provide a unitary tray. Handles on the heat shield permit the tray as a whole to be carried from place to place.

Figure 5:
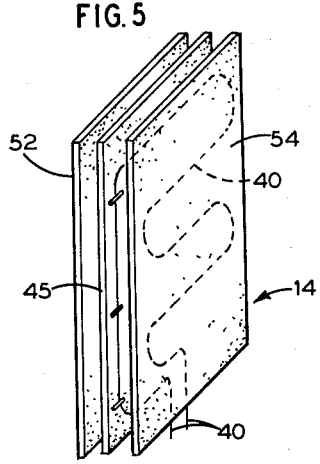
Figure 4:
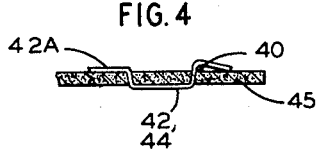
Figure 6:
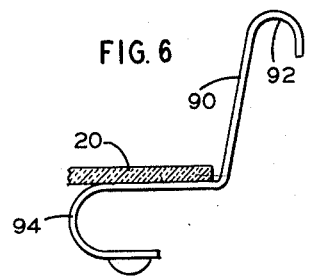
Figure 7:
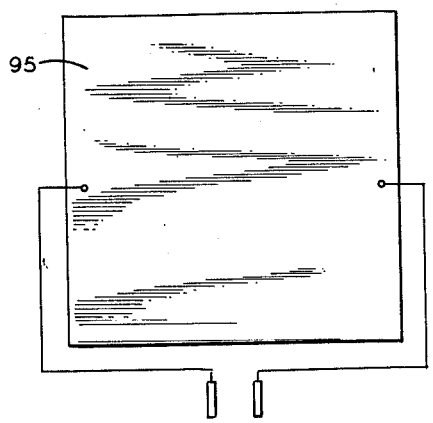
Figure 8:
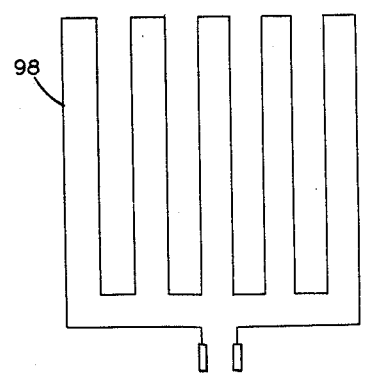

The construction of the tray of the invention, and the manner in which it is assembled and operated, are described in the accompanying specification and drawings, in which FIGURE 1 is an end view, partially in section and partially in perspective, of the portable heatable tray;
FIGURE 2 is an exploded view showing the various components of the tray of FIGURE 1;
FIGURE 3 is a plan view of a resistance card, on which an electrical resistance heating element is disposed and held;
FIGURE 4 is an edge view of the sheet of FIGURE 3, to show the open staple for looping the resistance element;
FIGURE 5 is a perspective end view of the heating element in FIGURE 3, shown sandwiched between heat insulating covers;
FIGURE 6 is a perspective view of an extruded plastic element employed as a handle and foot for the tray;
FIGURE 7 is a plan view, partly in section, of a sheet of conductive material;
FIGURE 8 is a plan view of a conductive layer in suitable configuration; and
FIGURE 9 is a plan view of the tray.

As shown in FIGURES 1, 2 and 9, a tray 10, in accordance with the invention, comprises a top shell 12, which may be of aluminum, a heating element sandwich 14, a bottom plate 16, preferably sheet metal, a heat shield or baffle 20 and two pairs of handle brackets 22–A and 22–B, with handles 24, between paired brackets.

The shell 12 is pressed into the shape of a pan, with a flat bottom 32, and side walls 33 which are folded over at their top edges 34 to provide downwardly extending aprons 35, which are then bent inwardly as shown in FIGURE 1, to lock the metal bottom plate 16 in place, as will be further explained below.

The heating element sandwich 14 is shown in more detail in FIGURES 3 and 4. As shown in FIGURE 3, a heating element wire 40 is wound in zig-zag fashion between two sets of staples 42 and 44 that are supported on a card or sheet of electrically insulating material 45, such as asbestos, or a heat-resistant plastic.

As shown in FIGURE 4, the staples 42 and 44 are disposed in open form, so their ends 42A can serve as hooks around which the wire 40 may be easily folded. This use of an open staple, in this manner, permits a very simple and inexpensive construction for supporting the heating wire 40. The two terminals 46 of the heating wire 40 are then brought out to a side edge of the insulating material card 45, for connection to a terminal plug later to be identified. Since the heating wire 40 is not covered with any insulation, the two terminal ends 46 are covered with suitable insulation 48 to protect them in the further assembling of the heating element 14.

As shown in FIGURE 5, the heating element 14 is made up of the insulation card 45 and its supported heating wire 40, plus two additional sheets 52 and 54 of insulating material, such as asbestos, on each side of the card 45. The two asbestos sheets 52 and 54 serve to cover and electrically insulate the heating wire 40 and the staples 42 and 44. This card, with its insulating sheets 52 and 54, can then be clamped between the shell 12 and the supporting sheet 16.

In FIGURE 2, the terminals 46 of the heating element 14 are shown extending from near a side edge, where they may be readily threaded through two holes 60 and 61, in plate 16, to be connected to a pin terminal block, shown here with two pins 62 in a suitable insulating and supporting block 63 that is in turn loosely supported but confined within a metallic box 64, provided with suitable side lugs 66 to be welded to the under side of the metal bottom plate 16, shown in FIGURE 2.

In assembling the tray, the heating element sandwich 14, is disposed on the metal bottom plate 16, with the wire terminals 46 extending through holes 60 and 61. Those terminals are then soldered to pins 62. The box 64 is then placed in position, around terminal pin block 63, and the box lugs 66 are welded to plate 16.

The metal bottom plate 16 serves as a support for the heating element sandwich 14, and for the upper shell 12 that will carry and confine any food vessels or containers that may be placed on the tray to be kept hot or to be heated.

The metal bottom plate 16 serves also to support the heat shield or baffle 20 and the handles 22–A and 22–B that are to be secured to that heat shield 20.

The manner in which the top shell 12 is secured to the metal bottom plate 16 may now be seen upon reference to FIGURES 1 and 2. The bottom plate 16 is provided along its edges with vertical side walls 70 of suitable dimensions to fit upward into the spaces on the under side of the upper shell 12 between the side rim walls 33 and the associated aprons 35.

While the upper shell 12 and the bottom plate 16 are held closely coupled, in such manner, the bottom edges of the side aprons 35 are tightly rolled over to fit under the corners 72 of the bottom plate 16, so that the bottom plate 16 and the upper shell 12 with the heating element 14 between them are formed into one coherent unit.

Prior to such assembly, four foot brackets 74 are welded to the bottom plate 16. Those four foot brackets 74 have suitable bolt holes 74–A to receive securing bolts (not shown) for mounting the heat shield and baffle 20 together with the handles 22–A and 22–B onto the brackets 74, through suitably located holes 20–A in the baffle plate 20 and holes 22–C in the two handle brackets 22–A and 22–B.

The two handle brackets 22–A and 22–B may be provided in pairs, for each end of the tray, as shown in FIGURE 1, with a handle 24 connected between the pair of brackets. The handle 24 may be of any suitable insulating material, such as wood or plastic. The lower ends of the handle brackets 22–A and 22–B are formed to constitute feet 80 with rubber pads 82.

In FIGURE 6 is shown a modified form of handle 90 consisting of an extruded length of plastic, shaped as shown in FIGURE 6, with a top curved section 92 folded over to provide a space for receiving the fingers of a hand, and with a lower portion 94 curved downwardly to provide a foot for the tray. In this case, as shown in FIGURE 6, the handle section 92 extends the full length, and the foot 94 likewise extends the full length, of the end sides of the tray.

By way of illustration, one type or form of heating element sandwich is shown in FIGURES 2, 3, 4 and 5, to serve as the source of heat to keep the top shell at desired temperature on its exposed surface.

In order to have such heat source in flat form for easy and ready assembly, heating elements of other types and materials may be utilized. For example, a thin sheet of conductive plastic 95, as in FIGURE 7, could be used, or a conductive rubber sheet, or a conductive fabric or film of material having appropriate resistivity to generate the amount of heat needed.

It is further contemplated, within the scope of the invention, that the heating element may be formed of conductive material such as metal of high resistivity, which could be thin stainless steel, about one mil thick cut out to provide an elongated or labyrinthian form 98 for the current path, as in FIGURE 8. Similarly, a metallic layer of arbitrary form and high resistivity may be sprayed to provide an ultimate conductive structure, similar to form 98, resembling a printed circuit, able to conduct the currents needed to generate the quantity of heat needed for the heated top surface member.

Thus, any such flat form may be readily sandwiched between the top exposed hot plate member and that bottom closure, to provide in effect a sandwich structure. Appropriate insulation may be disposed between the heating element and the bottom closure to direct the generated heat preferentially toward the top plate. In addition, the provision of a baffle, under the bottom closure of the sandwich structure, serves to protect any furniture surface on which the hot tray may be disposed for support.

The invention is thus not limited to the details shown, but may be modified without departing from the spirit and scope of the invention, as defined in the appended claims.

What is claimed is:
1. A portable heating tray, comprising
   (a) a main heating member having
      (1) a dish-shaped receptacle with a substantially flat bottom and a surrounding wall, and
      (2) a heating element of flat shape to rest against the flat bottom of the dish-shaped receptacle, and
      (3) means secured to said receptacle wall for supporting the heating element in contact with the bottom of the receptacle, said supporting means being so secured by a return folded portion of said receptacle wall, said return folded portion extending below and around the edges of said supporting means and being tightly peened over said edges of said supporting means,
   (b) a heat baffle suspended from said support for said heating element; and
   (c) handles secured to the baffle plate to transport the heating tray.

2. A portable heating tray, as in claim 1, in which the heating element consists of an electrical heating conductor disposed in a flat plane between two asbestos sheets held sandwiched between the flat bottom of said dish-shaped receptacle and the means secured to said receptacle for supporting said heating element, said heating element consisting of
   a supporting sheet of insulating material;
   two spaced sets of aligned open end staples anchored to said insulating material and disposed in echelon arrangement relative to each other;
   a heating element wire strung zig-zag between the open staples and with the two end terminals free;
   an insulation cover sheet on each side of the supporting sheet;
   and a terminal-plug connection supported on the heating unit and connected to the free terminals of wire heating element for connection to an external circuit.

References Cited in the file of this patent

UNITED STATES PATENTS

| | | |
|---|---|---|
| 963,892 | Haskins | July 12, 1910 |
| 1,729,866 | Cretors | Oct. 1, 1929 |
| 1,769,045 | Strite | July 1, 1930 |
| 1,786,507 | Reichart | Dec. 30, 1930 |
| 1,826,948 | Nelson | Oct. 13, 1931 |
| 1,871,705 | Keul | Aug. 16, 1932 |
| 2,012,981 | Wilsey | Sept. 3, 1935 |
| 2,164,650 | Goldthwaite | July 4, 1939 |
| 2,194,852 | Gundelfinger et al. | Mar. 26, 1940 |
| 2,505,117 | Hoffmann | Apr. 25, 1950 |
| 2,518,015 | Jeffrey | Aug. 8, 1950 |
| 2,679,736 | Duchin | June 1, 1954 |
| 2,680,800 | Chandler | June 8, 1954 |
| 2,820,878 | Mills | Jan. 21, 1958 |
| 2,952,761 | Smith-Johannsen | Sept. 13, 1960 |
| 2,961,522 | Hammer | Nov. 22, 1960 |
| 2,971,073 | Eisler | Feb. 7, 1961 |
| 3,020,379 | Ludlow et al. | Feb. 6, 1962 |